(12) United States Patent
Naganawa et al.

(10) Patent No.: US 8,414,023 B2
(45) Date of Patent: Apr. 9, 2013

(54) AIRBAG

(75) Inventors: Akitoshi Naganawa, Kiyosu (JP); Naohiko Ishiguro, Kiyosu (JP)

(73) Assignee: Toyoda Gosei Co., Ltd., Aichi-pref (JP)

( * ) Notice: Subject to any disclaimer, the term of this patent is extended or adjusted under 35 U.S.C. 154(b) by 114 days.

(21) Appl. No.: 13/046,916

(22) Filed: Mar. 14, 2011

(65) Prior Publication Data

US 2011/0241323 A1  Oct. 6, 2011

(30) Foreign Application Priority Data

Mar. 30, 2010 (JP) ................................ 2010-77556

(51) Int. Cl.
 *B60R 21/239* (2006.01)
 *B60R 21/2342* (2006.01)
(52) U.S. Cl.
 USPC ........................ 280/743.2; 280/739
(58) Field of Classification Search ............ 280/743.2, 280/739; B60R 21/239, 21/2334, 21/2342
 See application file for complete search history.

(56) References Cited

U.S. PATENT DOCUMENTS

| | | | | |
|---|---|---|---|---|
| 3,990,726 A | * | 11/1976 | Oka et al. .................. | 280/739 |
| 5,333,903 A | * | 8/1994 | Eyrainer et al. ............ | 280/743.1 |
| 5,454,595 A | * | 10/1995 | Olson et al. ................ | 280/743.1 |
| 5,979,937 A | * | 11/1999 | Yoshida et al. ............. | 280/743.2 |
| 6,142,517 A | * | 11/2000 | Nakamura et al. ............ | 280/739 |
| 6,352,283 B1 | * | 3/2002 | Ellerbrok et al. .......... | 280/743.1 |
| 7,441,805 B2 | * | 10/2008 | Jamison et al. ............ | 280/743.2 |
| 2004/0256845 A1 | * | 12/2004 | Damm .......................... | 280/739 |
| 2009/0236836 A1 | * | 9/2009 | Abe et al. ...................... | 280/739 |

FOREIGN PATENT DOCUMENTS

| | | | |
|---|---|---|---|
| JP | 6-286568 A | * | 10/1994 |
| JP | 7-17351 A | * | 1/1995 |
| JP | A-07-205738 | | 8/1995 |
| JP | 2007-76619 A | * | 3/2007 |
| JP | 2009-40160 A | * | 2/2009 |

* cited by examiner

*Primary Examiner* — Ruth Ilan
(74) *Attorney, Agent, or Firm* — Posz Law Group, PLC

(57) ABSTRACT

An airbag includes a tuck that is formed by tucking a part of the outer circumferential wall toward an interior of the airbag. The tuck includes two opposing walls, a turn-round region that forms a bottom of the tuck and outermost ends of the opposing walls adjacent to and continuing to an outer surface of the airbag. The airbag further includes a temporary joint that joins the opposing walls of the tuck together in such a manner as to disjoint when an inner pressure of the airbag at inflation is increased. The temporary joint is formed into such a line that extends toward the turn-round region and has a first end proximate the outermost ends and a second end in the vicinity of the turn-round region.

10 Claims, 14 Drawing Sheets

AIRBAG

The present application claims priority from Japanese Patent Application No. 2010-77556 of Naganawa et al., filed on Mar. 30, 2010, the disclosure of which is hereby incorporated into the present application by reference.

BACKGROUND OF THE INVENTION

1. Field of the Invention

The present invention relates to an airbag which includes an outer circumferential wall comprised of flexible sheet material, and is housed in a housing in a folded-up state and inflatable with inflation gas for emergence from the housing and deployment.

2. Description of Related Art

JP 7-205738 A discloses an airbag that includes on the outer circumferential wall a vent hole and a temporary joint which is formed by tucking a part of the outer circumferential wall encompassing the vent hole and sewing the tucked region with a sewing thread in such a manner as to close off the vent hole. With such a temporary joint, the airbag inflates with a suppressed volume in an initial stage of inflation and when the temporary joint is broken due to increase of inner pressure of the airbag, the airbag is allowed to inflate in a full volume.

However, since the tucked region in the conventional airbag is formed to protrude outwardly from the airbag, when the airbag is inflated with a suppressed volume while the temporary joint is kept jointed, the tucked region protrudes partially on the outer surface of the airbag, thereby making the contour of the airbag of suppressed volume irregular. Moreover, since the tucked region is likely to be caught by a housing of the airbag or a surrounding member, the airbag sometimes fails to inflate smoothly. Further, the temporary joint cannot be located on such a location as to contact with an occupant upon deployment since it is formed in a projecting fashion on the outer surface of the airbag.

Moreover, the temporary joint of the conventional airbag is formed into a generally V shape such that rupture of the temporary joint starts from the angular portion when an inner pressure of the airbag is increased. However, with this configuration, rupture or raveling of the temporary joint propagates to two directions since the temporary joint is bifurcate starting the angular portion, and therefore, raveling or rupture of the sewing thread occurs on more than one region proximate to each other. Accordingly, even more rapid disjointing is desired.

SUMMARY OF THE INVENTION

An object of the present invention is to provide an airbag whose outer circumferential wall forms a smooth curved surface generally all over when inflated with a suppressed volume, and which thus has a steady protecting property.

The object of the invention is achieved by a following airbag:

The airbag is folded up and housed in a housing for inflation with inflation gas and deployment and includes:

an outer circumferential wall made of flexible sheet material;

a tuck that is formed by tucking a part of the outer circumferential wall toward an interior of the airbag so as to have a generally V-shaped section, the tuck including two opposing walls that oppose each other, a turn-round region that interconnects the opposing walls and forms a bottom of the tuck and outermost ends of the opposing walls that are adjacent to and continuing to an outer surface of the airbag;

a temporary joint that joins the opposing walls of the tuck together partially in an area of the tuck in such a manner as to disjoint when an inner pressure of the airbag at inflation is increased, the temporary joint being formed into such a line that extends in a direction intersectional with a cleft formed between the outermost ends and toward the turn-round region and has a first end proximate the outermost ends and a second end in the vicinity of the turn-round region.

In the airbag thus configured, the temporary joint is formed by joining the opposing walls together in an area of the tuck that is formed by tucking a part of the outer circumferential wall toward an interior of the airbag. With this configuration, when the airbag inflates with a suppressed volume with the temporary joint kept jointed, the temporary joint does not appear on the outer surface of the airbag. Further, the temporary joint extends toward the turn-round region that forms the bottom of the tuck and has the first end proximate the outermost ends near the outer surface of the airbag and the second end in the vicinity of the turn-round region. Accordingly, when the airbag inflates with a suppressed volume, the outer circumferential wall of the airbag stays smooth even in areas where the tuck and temporary joint are located as well as the temporary joint hardly appears on the outer surface of the airbag. Therefore, there is no problem in locating the temporary joint on such an area of the airbag as to be contactable with an occupant.

When the airbag inflated in a suppressed volume with the temporary joint kept jointed cushions an occupant and resultingly is increased in inner pressure, the temporary joint stops jointing the opposing walls. With the configuration of the invention, since the first end of the temporary joint is located proximate the outermost ends of the opposing walls, which are adjacent to and continuing to the outer surface of the airbag, a tensile force exerted on the outer circumferential wall of the airbag due to pressure increase so acts to separate the outermost ends of the opposing walls, and triggers disjointing of the temporary joint from the first end on which a stress concentration easily occurs. Since the temporary joint is formed into such a line that extends in a direction intersectional with the cleft formed between the outermost ends and toward the turn-round region, once the disjointing starts from the first end, the opposing walls are separated from each other from the outermost ends, as if the outermost ends or the cleft gradually moved toward the turn-round region. Then along with the movement of the outermost ends or cleft, disjointing of the temporary joint smoothly propagates to the turn-round region. Especially in the present invention, since the temporary joint is formed into a single line, disjointing starts at the first end located proximate the outermost ends and proceeds to the second end located in the vicinity of the turn-round region. Thus, disjointing is preformed quickly.

That is, with the airbag of the invention, the temporary joint disjoints quickly and smoothly since disjointing occurs at the first end immediately when the airbag is increased in inner pressure, and propagates to the second end. When the disjointing is completed, the airbag is increased in volume, and therefore, the inner pressure of the airbag is lowered, thereby providing a soft cushioning effect.

Therefore, the airbag of the present invention has a smooth curved surface generally all over even when inflated with a suppressed volume and provides a steady protecting property.

If the airbag configured as above includes a vent hole at such a position on the opposing walls of the tuck that is closer to the turn-round region than the temporary joint is, the vent hole is closed when the temporary joint remains jointed since an inflation gas fed into the airbag pushes regions of the opposing walls located on the side of the turn-round region relative to the temporary joint against each other, and opens up when the temporary joint disjoints. If thus an extra inflation gas is released from the vent hole upon disjointing of the temporary joint, an excessive increase of inner pressure of the airbag is prevented and an even softer cushioning effect is provided.

The tuck described above may be provided with two temporary joints. This configuration will enlarge an area that the temporary joints join the outer circumferential wall together, thereby making smaller the volume of the airbag inflated with the temporary joints kept jointed, i.e. making a difference in volume of the airbag great between before and after disjointing of the temporary joints.

The two temporary joints are desirably so formed as to come close to each other toward the turn-round region and have the second ends in common. With this configuration, the temporary joints extend over a wide range in a direction extending along the turn-round region on the side of the outermost ends relative to the vent hole on the tuck. In other words, when the temporary joints remain jointed, the regions of the opposing walls on the side of the outermost ends relative to the vent hole are coupled together over a wide range in a direction extending along the turn-round region that is intersectional with such a direction as to separate the opposing walls from each other. Accordingly, the regions of the opposing walls on the side of the outermost ends relative to the vent hole remain attached to each other and prevent the vent hole from opening up and leak gas as much as possible while the temporary joints remain jointed.

Moreover, if the temporary joints configured as above are formed by sewing with a sewing thread, manufacturing of the temporary joints will be facilitated in comparison with an instance of using adhesive or the like, and disjointing of the temporary joints will be facilitated as well, because once the sewing thread is ruptured, raveling will smoothly propagate to the whole joints.

It is desired that the airbag of the invention is configured for use for a steering wheel and the outer circumferential wall is comprised of an occupant side wall deployable toward an interior of a vehicle and a vehicle body side wall deployable on the side of the steering wheel, which have identical generally circular outer contours. In such an instance, the tuck and the temporary joint are formed on at least one of the occupant side wall and vehicle body side wall, and the tuck is formed by tucking a part of the occupant side wall and/or vehicle body side wall in a circumferential direction extending along an outer edge of each of the walls.

This configuration, when the airbag is inflated with a suppressed volume with the temporary joints kept jointed, will hardly act to reduce the thickness of the airbag, but form the airbag into such a contour as a generally convex lens with a slightly shortened outer circumference and thus with a slightly reduced outer diameter, because the tuck is formed by tucking a part of the circular occupant side wall and/or circular vehicle body side wall in a circumferential direction extending along the outer edge of each of the walls and the temporary joints join the opposing walls of the tuck together partially. Therefore, even when inflated with a suppressed volume, the airbag will provide a sufficient thickness at the center area and a wide coverage over the steering wheel.

In the above configuration, if the tuck and temporary joint are formed on both of the vehicle body side wall and occupant side wall, the airbag will be assuredly prevented from inflating into an irregular shape when inflated with the temporary joints kept jointed, since both of the occupant side wall and vehicle body side wall are reduced in length of the outer circumference slightly, and the difference in volume of the airbag between before and after disjointing of the temporary joints will be increased.

DESCRIPTION OF PREFERRED EMBODIMENTS

Preferred embodiments of the present invention are described below with reference to the accompanying drawings. In the preferred embodiments, the invention is described as applied to an airbag 20 for use in an airbag apparatus M mountable on a steering wheel. However, the invention is not limited to the embodiments disclosed herein. All modifications within the appended claims and equivalents relative thereto are intended to be encompassed in the scope of the claims.

Unless otherwise specified, front/rear, up/down, and left/right directions in the embodiments are based on a steering wheel W mounted on a vehicle and steered straight ahead. Specifically, up/down direction is intended to refer to an up/down direction extending along an axial direction of a steering shaft SS (FIG. 2) on which the steering wheel W is mounted. Front/rear direction is intended to refer to a front/rear direction of a vehicle extending orthogonal to the axial direction of the steering shaft SS, and left/right direction is intended to refer to a left/right direction of a vehicle extending orthogonal to the axial direction of the steering shaft SS.

Figure 1:
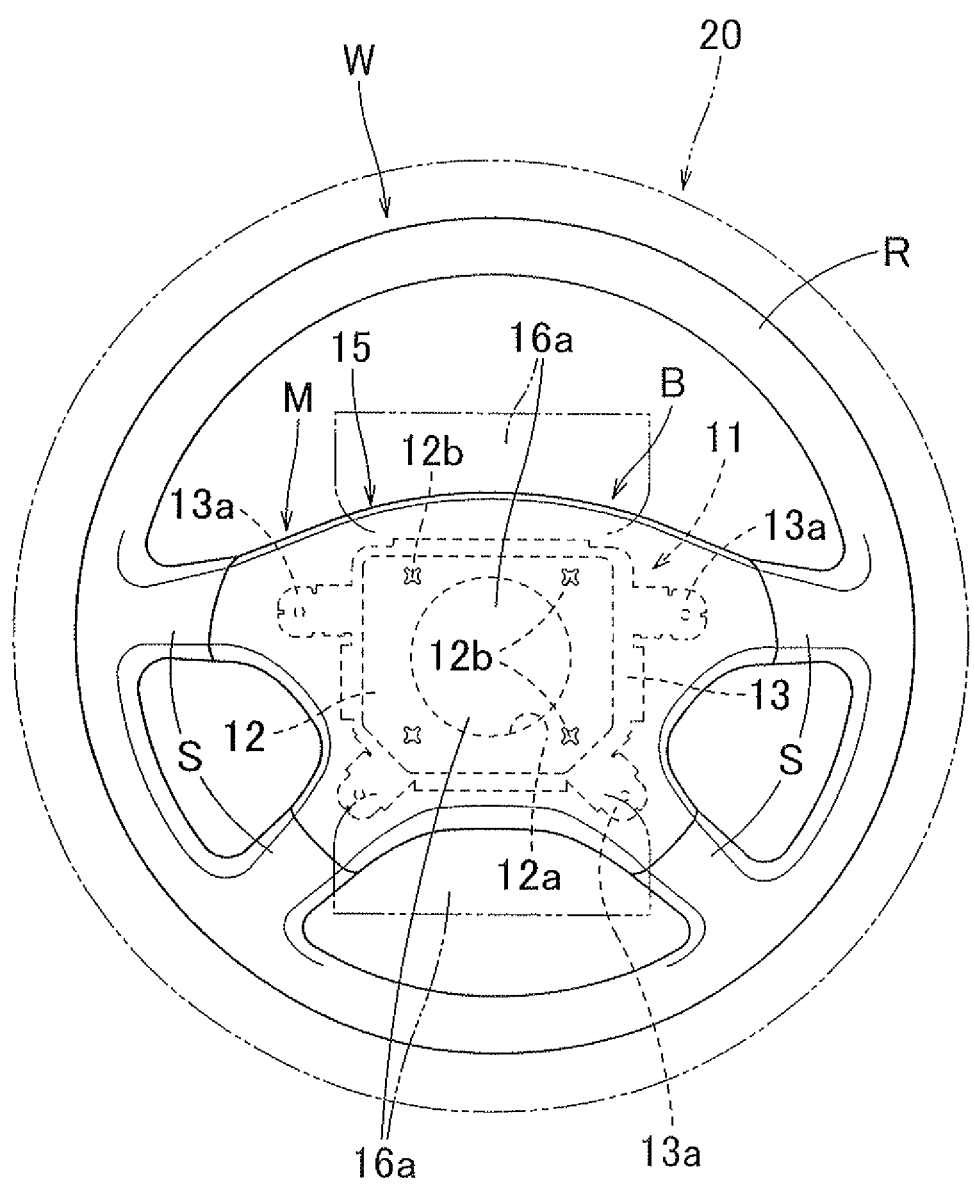
FIG. 1 is a schematic plan view of an airbag apparatus for use for a steering wheel provided with an airbag embodying the invention, and shows the airbag at full inflation by a double-dashed line.
Figure 2:
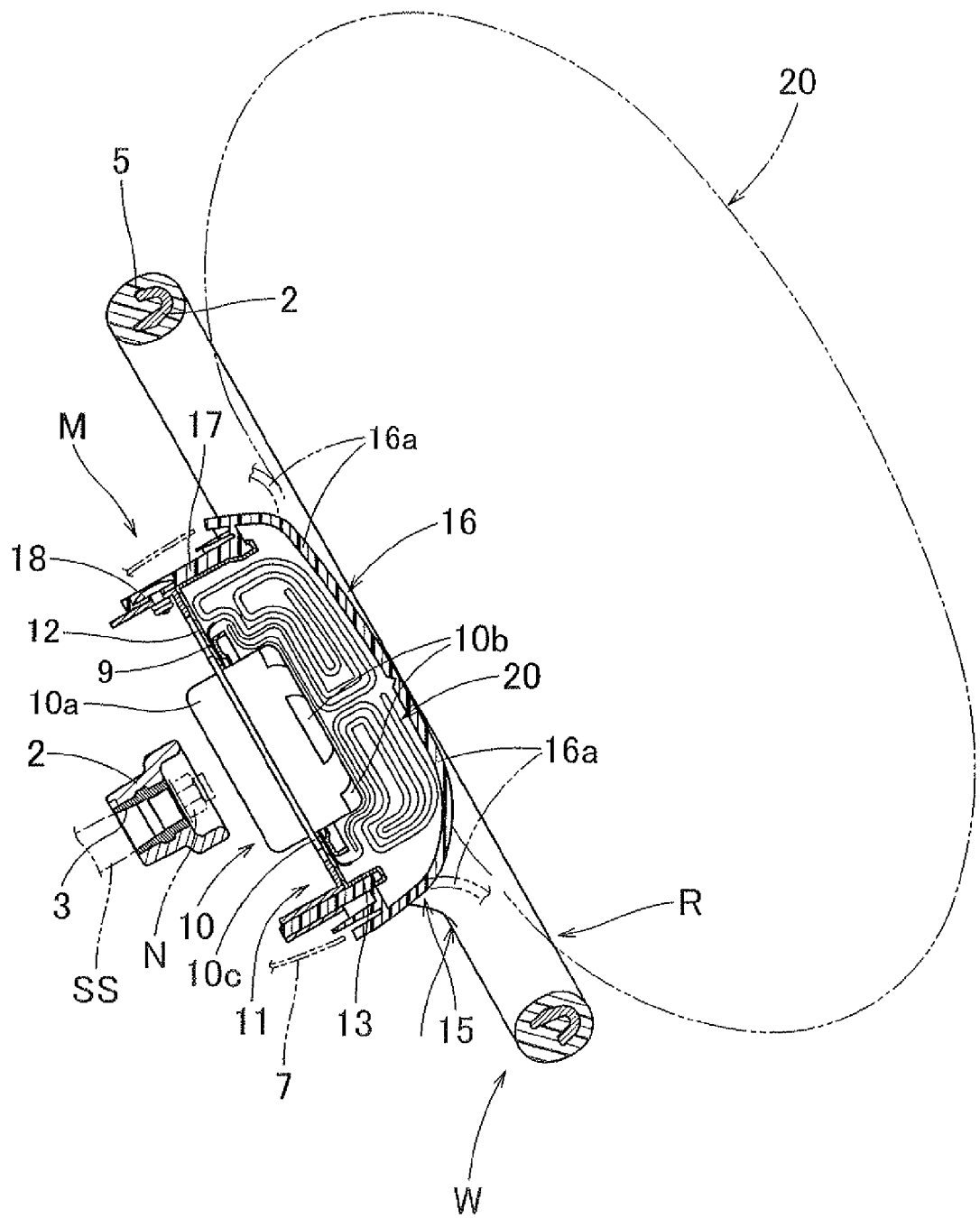
FIG. 2 is a schematic vertical section of the airbag apparatus of FIG. 1 as mounted on a vehicle, showing the airbag at full inflation by a double-dashed line.

As shown in FIGS. 1 and 2, the steering wheel W of this specific embodiment includes a steering wheel body 1 and the airbag apparatus M mounted on top of a boss area B located at the center of the wheel body 1. The steering wheel body 1 includes an annular ring R for holding at steering operation, a boss area B located at the center of the ring R for connection with the steering shaft SS and a plurality of (four, in this embodiment) spokes S that connect the ring R and boss area B.

As shown in FIGS. 1 and 2, the wheel body 1 includes a wheel core 2, a cladding layer 5 and a lower cover 7. The wheel core 2 is fabricated of such metal as aluminum alloy and has such a contour that the ring R, boss area B and spokes S are interconnected. The cladding layer 5 is made from synthetic resin and covers the core 2 at the ring R and regions of the spokes S in the vicinity of the ring R. At an area of the core 2 corresponding to the boss area B is a steel boss 3 through which the steering shaft SS is inserted for nut N fixing. The lower cover 7 is made from synthetic resin and covers a lower region of the boss area B underneath the wheel body 1.

The airbag apparatus M is located at the boss area B at the center of the steering wheel W as shown in FIGS. 1 and 2, and includes an airbag 20 which is housed in a folded state, an inflator 10 for supplying the airbag 20 with inflation gas, a case or housing 11 which houses and holds the airbag 20 and inflator 10, an airbag cover 15 covering an upper side of the airbag 20, a retainer 9 that attaches the airbag 20 and inflator 10 to the case 11.

The retainer 9 has a square annular shape so a later-described columnar body 10a of the inflator 10 is put through from the lower side. The retainer 9 is provided at four corners thereof with unillustrated bolts projecting downward. The retainer 9 is housed inside the airbag 20 with the bolts projecting out of later-described mounting holes 24 of the airbag 20, which bolts are put through a bottom wall 12 of the case 11 and a flange 10c of the inflator 10 and fastened with nuts, thereby securing the airbag 20 and inflator 10 to the case 11.

The inflator 10 includes a body 10a and a flange 10c. The body 10a is substantially columnar in shape and is provided on top with gas discharge ports 10b. The flange 10c is formed into a square plate shape projecting from the outer circumference of the body 10a and has unillustrated through holes for receiving the bolts of the retainer 9.

As shown in FIGS. 1 and 2, the case or housing 11 is made of sheet metal and includes a bottom wall 12 having a rectangular plate shape and a side wall 13 extending vertically from the outer periphery of the bottom wall 12. The bottom wall 12 is provided with a circular insert hole 12a for receiving the body 10a of the inflator 10 from lower side, as shown in FIG. 2. Around the insert hole 12a are four through holes 12b for receiving the bolts of the retainer 9. At the upper end of the side wall 13 are mounting tongues 13a (FIG. 1) extending outwardly, to which mounting tongues 13a mounting bases of unillustrated horn switches are secured. In this specific embodiment, the mounting bases are used to secure the case 11 to the core 2 of the steering wheel W. Thus the airbag apparatus M is mounted on top of the boss area B of the steering wheel body 1 mounted on the steering shaft SS. Moreover, as shown in FIG. 1, a later-described side wall 17 of the airbag cover 15 is attached to the side wall 13 of the case 11 with rivets 18 or the like.

The airbag cover 15 is fabricated of synthetic resin and includes a ceiling wall 16 covering the housed airbag 20 from above and a side wall 17 having a generally square tubular shape extending downward from the vicinity of the outer periphery of the ceiling wall 16. The ceiling wall 16 includes two doors 16a which are openable forward and rearward when pushed by the inflated airbag 20.

As indicated by double-dashed lines in FIGS. 1 and 2, the airbag 20 is designed inflatable into such a contour as a convex lens with a thick center and a thin hem, sized to cover generally all over the top face of the steering wheel W. The outer edge of the airbag 20 generally forms a circle. The outer circumferential wall 21 of the airbag 20 is made of flexible sheet material and formed into a bag inflatable with an inflation gas. The outer circumferential wall 21 in this embodiment is formed of flexible fabric woven of polyamide, polyester yarn or the like, and is comprised of a generally circular occupant side wall 33 deployable toward an interior of a vehicle and a generally circular vehicle body side wall 22 deployable on the side of the steering wheel W. The occupant side wall 33 and vehicle body side wall 22 are identical in outer contour. The airbag 20 is formed into a bag by sewing (connecting) together outer edges 22a and 33a of the vehicle body side wall 22 and occupant side wall 33 by an edging joint 40 (FIGS. 3, 4 and 9).

Figure 3:
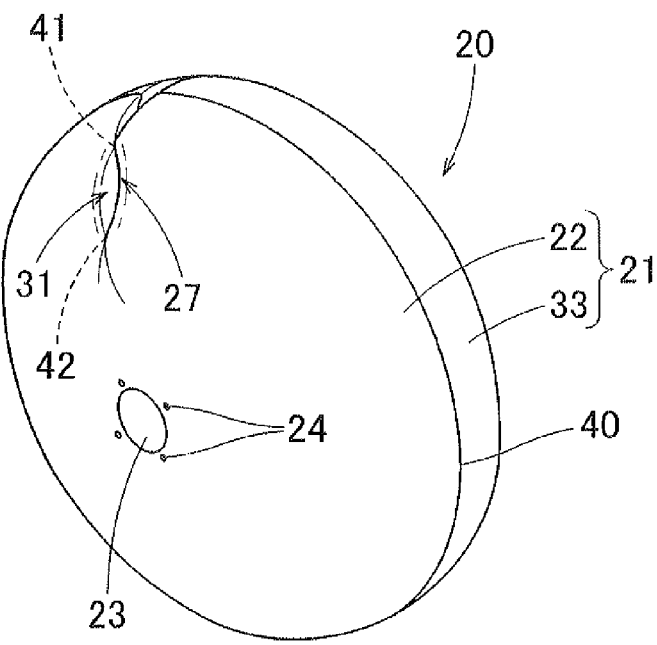
FIG. 3 is a schematic perspective view of the airbag of FIG. 1 as is inflated by itself with the temporary joint kept jointed, viewed from the front.
Figure 4:
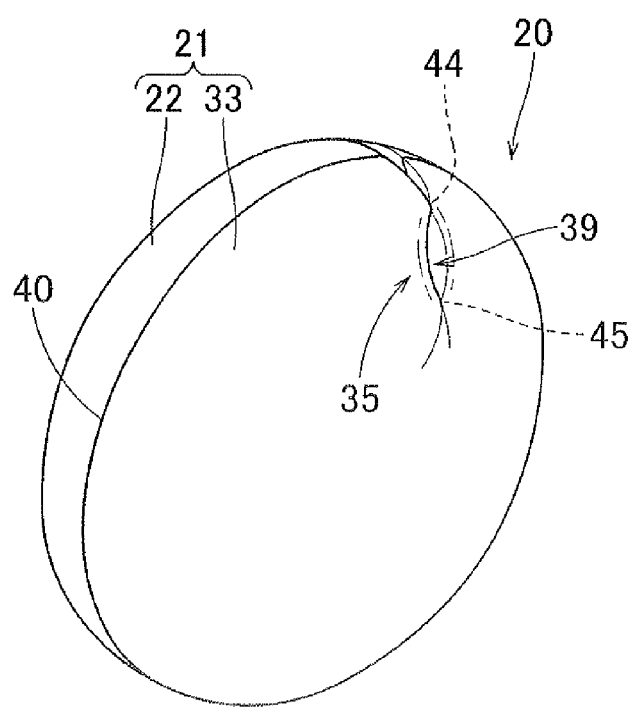
FIG. 4 is a schematic perspective view of the airbag of FIG. 3 as viewed from the rear.
Figure 9:
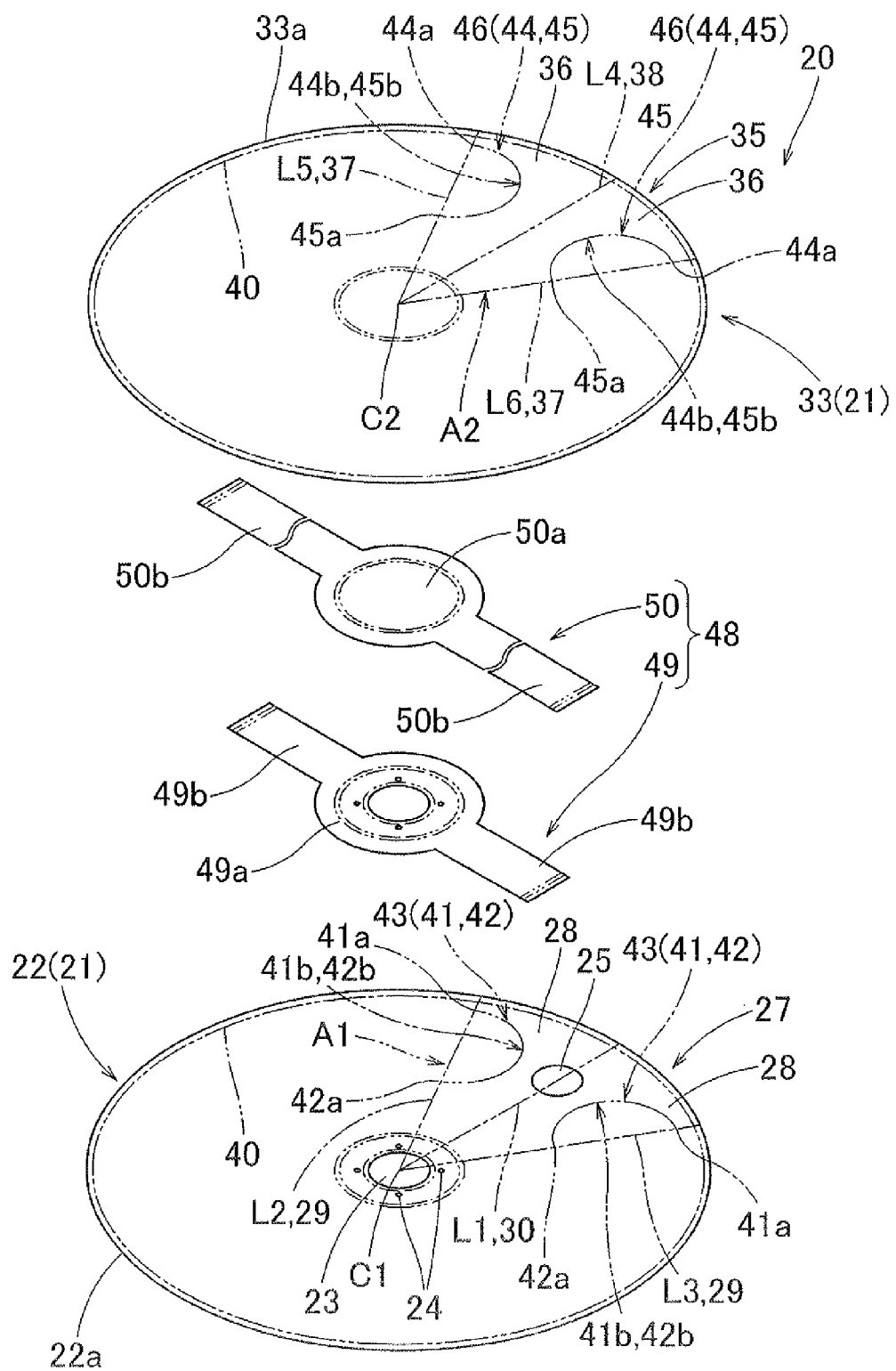
FIG. 9 is a schematic exploded perspective view of the airbag of FIG. 3.

As shown in FIGS. 3 and 9, the vehicle body side wall 22 includes at the center a circular inlet port 23 for receiving the inflator body 10a from below and admitting inflation gas discharged from the gas discharge ports 10b of the inflator 10. Around the inlet port 23 are four mounting holes 24 for receiving the unillustrated bolts of the retainer 9.

The vehicle body side wall 22 includes two temporary joints 41 and 42 that joins parts of the vehicle body side wall 22 together whereas the occupant side wall 33 includes two temporary joints 44 and 45 that joins parts of the occupant side wall 33 together. The temporary joints 41 and 42 are located within an area of a tuck 27 that is formed by tucking a part of the vehicle body side wall 22 toward an interior of the airbag 20. The temporary joints 44 and 45 are located within an area of a tuck 35 that is formed by tucking a part of the occupant side wall 33 toward an interior of the airbag 20.

Figure 5:
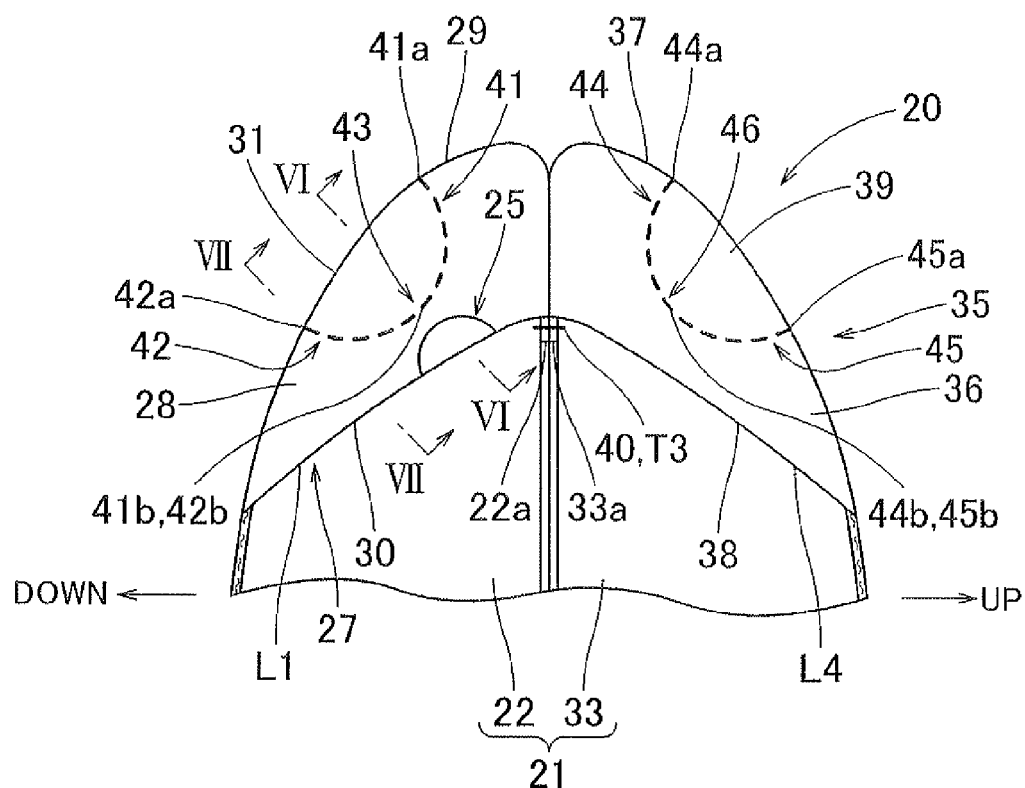
FIG. 5 is a partial enlarged vertical section of the airbag of FIG. 3, showing temporary joints and its vicinity.
Figure 6:
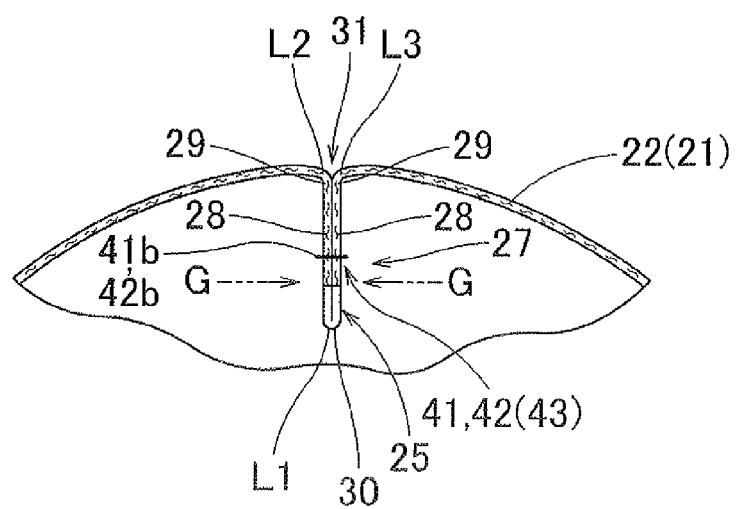
FIG. 6 is a sectional view taken along line VI-VI of FIG. 5.
Figure 7:
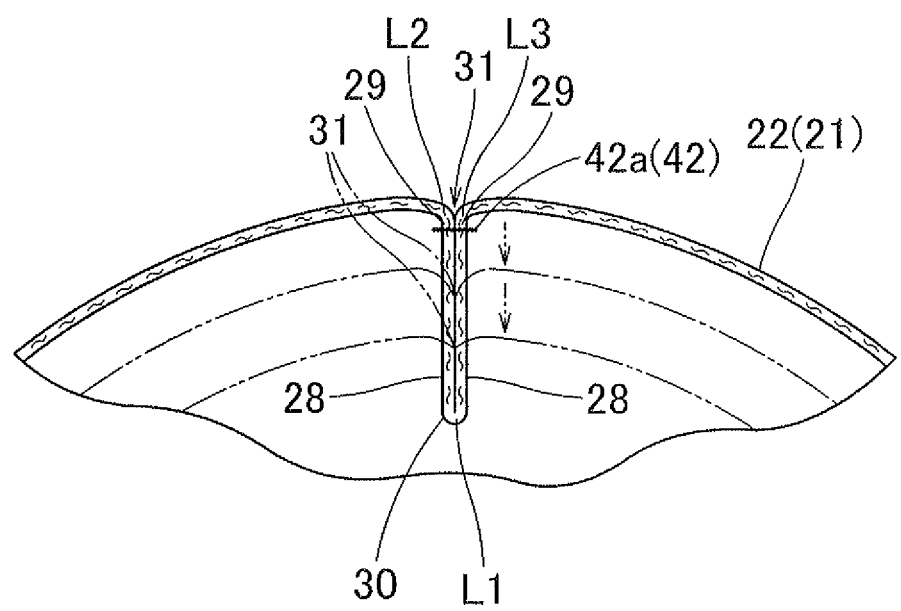
FIG. 7 is an enlarged sectional view taken along line VII-VII of FIG. 5.

The tuck 27 is formed by tucking a part of the vehicle body side wall 22 in a circumferential direction of the vehicle body side wall 22. In this specific embodiment, it is formed by tucking a region of the wall 22 in front of the inlet port 23 and generally at the center in a left and right direction, in a circumferential direction extending along the outer edge 22a of the wall 22. As shown in FIGS. 5 to 7, the tuck 27 extends along a vertical direction and front and rear direction of the airbag 20 as inflated, and is formed to have a generally V-shaped section provided with two opposing walls 28 that oppose each other in a left and right direction, a turn-round region 30 that interconnects the opposing walls 28 and forms the bottom of the tuck 27, and outermost ends 29 of the opposing walls 28 adjacent to and continuing to the outer surface of the airbag 20. In this embodiment, the turn-round region 30 of the tuck 27 extends along a front and rear direction and along a line L1 extending forward through the center C1 (which equals to the center of the inlet port 23) of the vehicle body side wall 22 in a flattened state as shown in FIGS. 9, 10A to 10C and 12. Each of the outermost ends 29 of the opposing walls 28 is formed along a line L2/L3 that runs through the center C1 of the vehicle body side wall 22 as is flattened and extends obliquely relative to a front and rear direction on the left and right of the line L1 constituting the turn-round region 30. That is, the tuck 27 is comprised of a generally sectorial region A1 of the vehicle body side wall 22 defined by the lines L2 and L3, and each of the opposing walls 28 is comprised of a region defined by the lines L1 and L3/L1 and L2.

The temporary joints 41 and 42 are disposed side by side in a front and rear direction within a region of the tuck 27 and respectively join the opposing walls 28. The temporary joints 41 and 42 are located proximate the front end (i.e., in a region which is wide in a left and right direction in a flattened state) of the tuck 27. Each of the temporary joints 41 and 42 is formed into such a line that extends in a direction intersectional with a cleft 31 (FIGS. 3, 5 to 7) formed between the outermost ends 29 and toward the turn-round region 30. In this embodiment, the cleft 31 formed between the outermost ends 29 extends generally along a front and rear direction. Specifically, the temporary joint 41 located on the front side is formed into such a line as a generally quarter arc of a circle having the front end (first end) 41a located proximate the outermost ends 29 and having the rear end (second end) 41b located in the vicinity of the turn-round region 30. The temporary joint 42 located on the rear side is formed into such a line as a generally quarter arc of a circle having the rear end (first end) 42a located proximate the outermost ends 29 and having the front end (second end) 42b located in the vicinity of the turn-round region 30. The temporary joints 41 and 42 are so formed as to come close to each other toward the turn-round region 30 and have the second ends 41b and 42b in common.

Figure 12A:
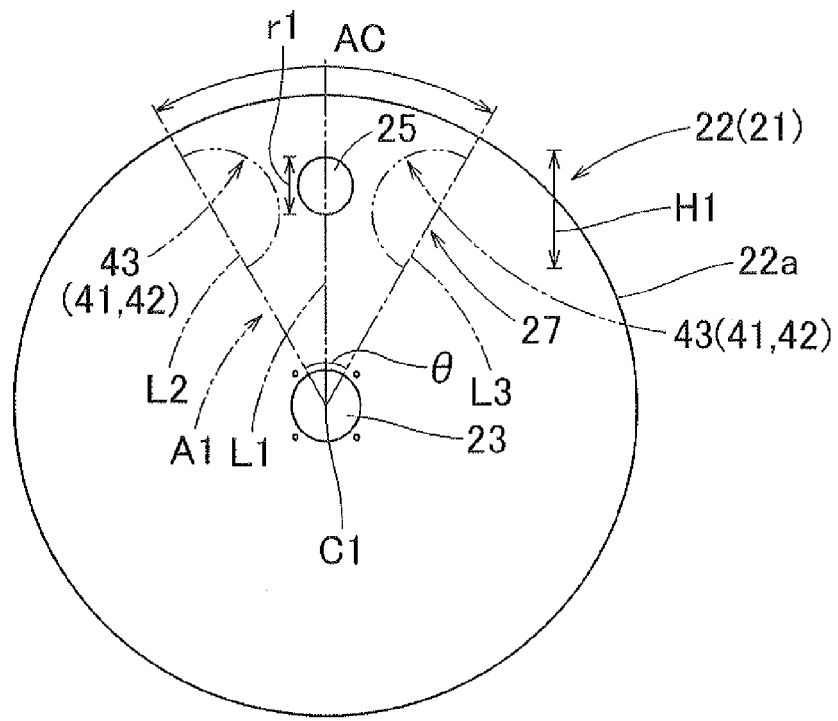
FIG. 12A illustrates the vehicle body side wall before the tuck and temporary joints are formed.
Figure 12B:
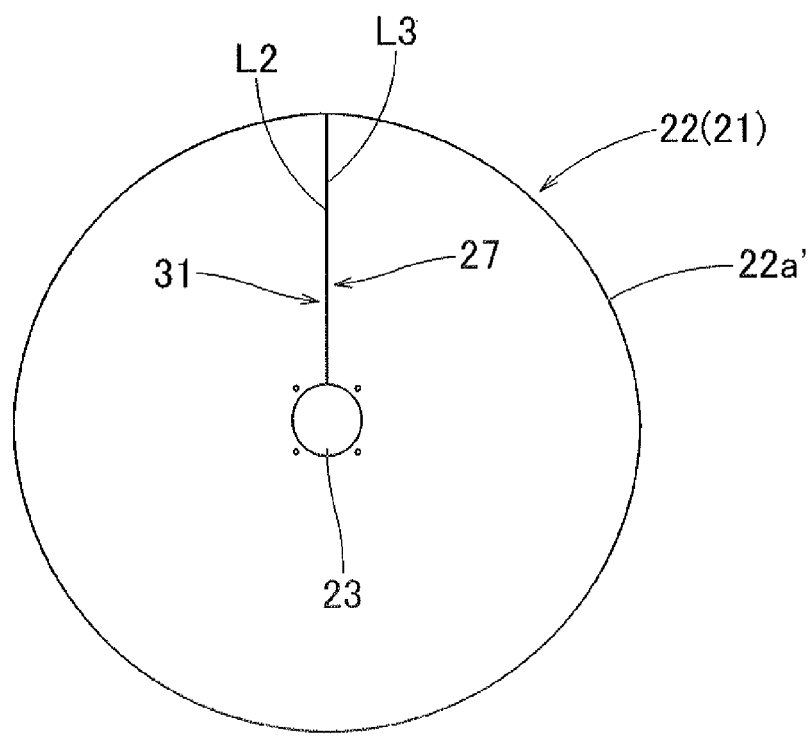
FIG. 12B illustrates the vehicle body side wall with the tuck and temporary joints.

In this embodiment, the temporary joints 41 and 42 are comprised of a sewn seam 43 continuously formed with sewing threads T1 and T2. As shown in FIGS. 5 and 10A to 10C, the sewn seam 43 is formed into such a shape as to bulge toward the turn-round region 30 (i.e., protrude upward) such that its opposite ends or first ends 41a and 42a of the temporary joints 41 and 42 are located proximate the outermost ends 29 and an intermediate region or second ends 41b and 42b of the temporary joints 41 and 42 are located on a direction orthogonal to the cleft 31. More specifically, as shown in FIGS. 9, 12A and 12B, in the vehicle body side wall 22 in a flattened state, the sewn seam 43 is formed into a generally semi-arcuate shape having the opposite ends located on the lines L2 and L3 and having the intermediate region bulge toward the line L1 or turn-round region 30.

Moreover, the temporary joints 41 and 42 are located in a front half region of the tuck 27, and the front end (first end) 41a of the front temporary joint 41 is located proximate the outer edge 22a of the vehicle body side wall 22 (proximate the edging joint 40 of the airbag 20). A gap is formed between the second ends 41b and 42b located in the vicinity of the turn-round region 30 and the line L1 (FIG. 9).

Figure 10A:
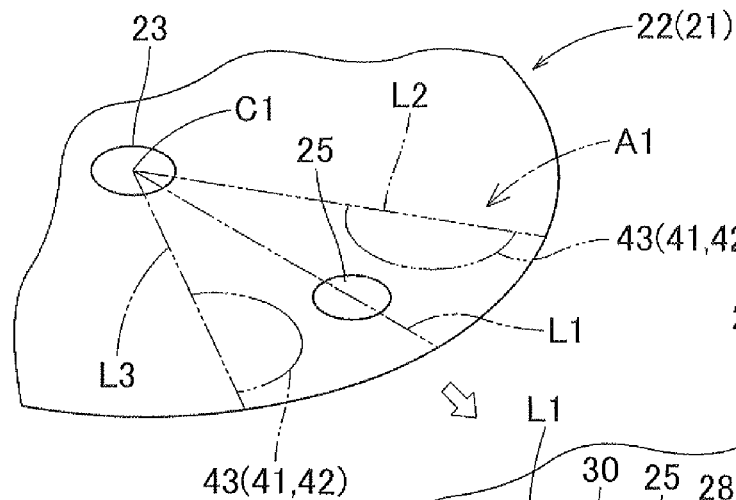
FIGS. 10A to 10C illustrate the way a tuck and the temporary joints are formed on a vehicle body side wall by schematic partial enlarged perspective views.
Figure 10B:
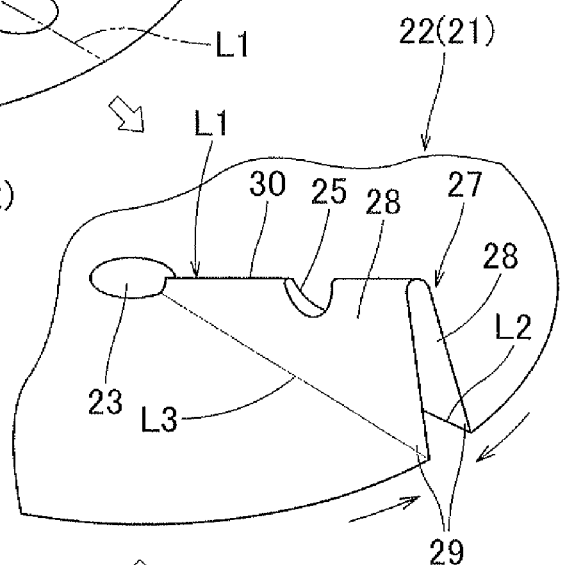
Figure 10C:
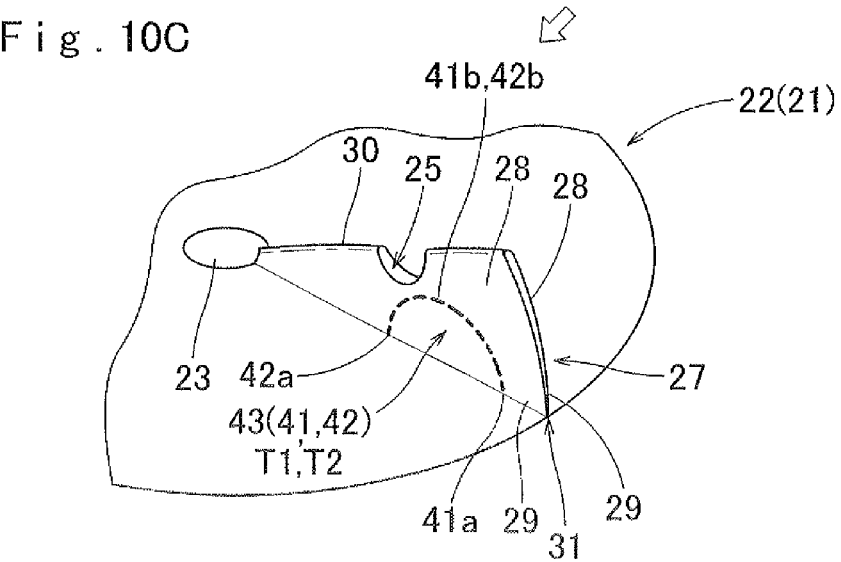

Referring to FIGS. 10A and 10B, specifically, the tuck 27 is formed by firstly folding the generally sectorial region A1 that broadens from the center C1 toward the front edge of the vehicle body side wall 22 as flattened on the line L1 so the line L1 forms a mountain fold while making valley folds on the lines L2 and L3. If the valley folds, i.e., lines L2 and L3, are brought close to each other such that the opposing walls 28 oppose each other by the outer surfaces (the undersides in FIGS. 10A to 10C), the tuck 27 is formed to protrude toward an interior of the airbag 20 (upward, in FIGS. 10A to 10C). Then if the opposing walls 28 are sewn up with the sewing threads T1 and T2 as shown in FIG. 10C to form a single sewn seam 43 having the first ends 41a and 42a located on the valley folds (lines L2 and L3) while bulging toward the mountain fold (line L1), the temporary joints 41 and 42 are formed. In this specific embodiment, since the temporary joints 41 and 42 sew up only a part of the tuck 27, when the airbag 20 is inflated, a region of the tuck 27 apart from the temporary joint 41 and 42 and near the inlet port 23 unfolds and smoothly continues to a surrounding area of the vehicle body side wall 22 although the region in the vicinity of the temporary joints 41 and 42 stays inside the airbag 20 (FIGS. 3 and 5).

Similarly to the tuck 27 and temporary joints 41 and 42 formed on the vehicle body side wall 22, the tuck 35 and temporary joints 44 and 45 formed on the occupant side wall 33 are formed proximate the front end of the airbag 20 at full inflation. The tuck 35 and temporary joints 44 and 45 are generally identical in contour to and located generally at the same location as the tuck 27 and temporary joints 41 and 42, on the occupant side wall 33.

That is, the tuck 35 is formed by tucking a front region of the occupant side wall 33 generally at the center in a left and right direction, in a circumferential direction extending along the outer edge 33a of the wall 33. As shown in FIGS. 5 and 11A to 11C, the tuck 35 extends along a vertical direction and front and rear direction of the airbag 20 as inflated, and is formed to have a generally V-shaped section provided with two opposing walls 36 that oppose each other in a left and right direction, a turn-round region 38 that interconnects the opposing walls 36 and forms the bottom of the tuck 35, and outermost ends 37 of the opposing walls 36 adjacent to and continuing to the outer surface of the airbag 20. Also in the occupant side wall 33, the turn-round region 38 of the tuck 35 extends along a front and rear direction and along a line L4 extending forward through the center C2 of the occupant side wall 33 in a flattened state. Each of the outermost ends 37 of the opposing walls 36 are formed along a line L5/L6 that runs through the center C2 of the occupant side wall 33 as is flattened and extends obliquely relative to a front and rear direction on the left and right of the line L4 constituting the turn-round region 38. That is, the tuck 35 is comprised of a generally sectorial region A2 of the occupant side wall 33 defined by the lines L5 and L6, and each of the opposing walls 36 is comprised of a region defined by the lines L4 and L5/L4 and L6.

The temporary joints 44 and 45 are disposed side by side in a front and rear direction within a region of the tuck 35 and respectively join the opposing walls 36. As shown in FIGS. 4 and 5, each of the temporary joints 44 and 45 is formed into such a line that extends in a direction intersectional with a cleft 39 formed between the outermost ends 37 of the tuck 35 and toward the turn-round region 38. The temporary joint 44 located on the front side is formed into such a line as a generally quarter arc of a circle having the front end (first end) 44a located proximate the outermost ends 37 and having the rear end (second end) 44b located in the vicinity of the turn-round region 38. The temporary joint 45 located on the rear side is formed into such a line as a generally quarter arc of a circle having the rear end (first end) 45a located proximate the outermost ends 37 and having the front end (second end) 45b located in the vicinity of the turn-round region 38. The temporary joints 44 and 45 are so formed as to come close to each other toward the turn-round region 38 and have the second ends 44b and 45b in common.

Similarly to the temporary joints 41 and 42, the temporary joints 44 and 45 are comprised of a sewn seam 46 continuously formed with the sewing threads T1 and T2. The sewn seam 46 is formed into such a shape as to bulge toward the turn-round region 38 (i.e., protrude downward) such that its opposite ends or first ends 44a and 45a of the temporary joints 44 and 45 are located proximate the outermost ends 37 and an intermediate region or second ends 44b and 45b of the temporary joints 44 and 45 are located in the vicinity of the turn-round region 38. Similarly to the sewn seam 43 of the vehicle body side wall 22, in the occupant side wall 33 in a flattened state, the sewn seam 46 is formed into a generally semi-arcuate shape having the opposite ends located on the lines L5 and L6 and having the intermediate region bulge toward the line L4 or turn-round region 38, leaving a gap between the most bulged region (i.e., second ends 44b and 45b) and the line L4 (FIG. 9).

Figure 11A:
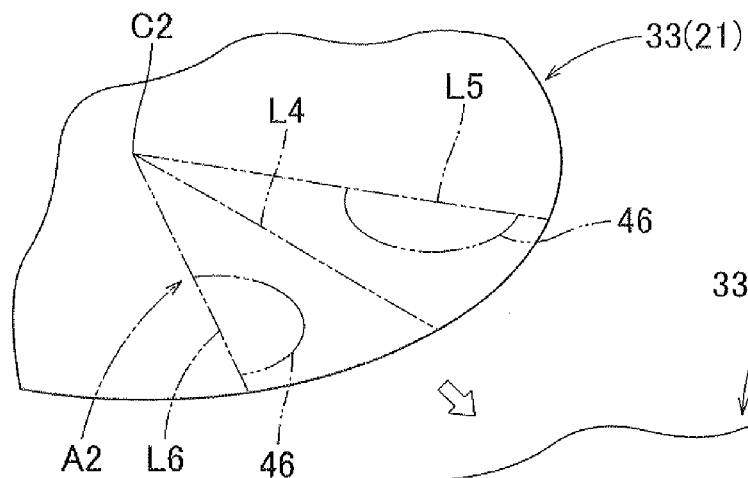
FIGS. 11A to 11C illustrate the way a tuck and the temporary joints are formed on an occupant side wall by schematic partial enlarged perspective views.
Figure 11B:
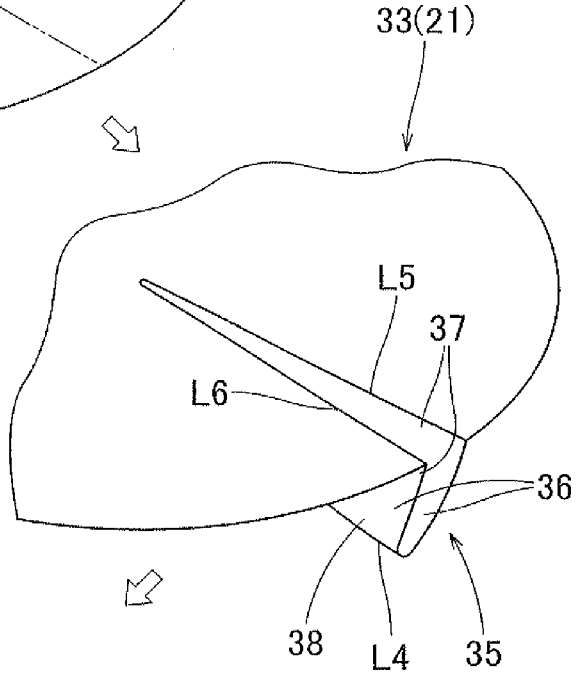
Figure 11C:
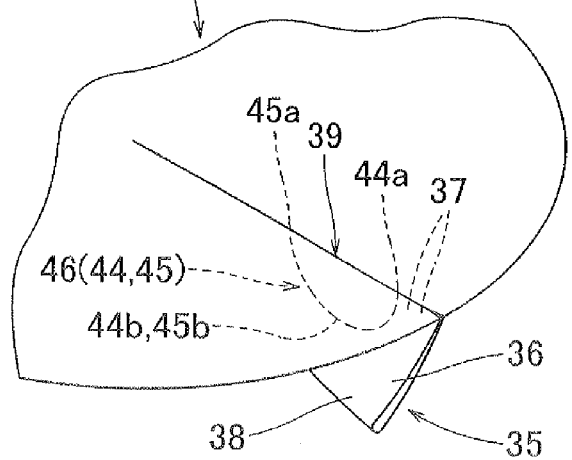

Referring to FIGS. 11A and 11B, also in the occupant side wall 33, the tuck 35 is formed by firstly folding the generally sectorial region A2 that broadens from the center C2 toward the front edge of the occupant side wall 33 as flattened on the line L4 so the line L4 forms a valley fold while making mountain folds on the lines L5 and L6. If the mountain folds, i.e., lines L5 and L6, are brought close to each other such that the opposing walls 36 oppose each other by the outer surfaces (the top sides in FIGS. 11A to 11C), the tuck 35 is formed to protrude toward an interior of the airbag 20 (downward, in FIGS. 11A to 11C). Then if the opposing walls 36 are sewn up with the sewing threads T1 and T2 as shown in FIG. 11C to form a single sewn seam 46 having the first ends 44a and 45a located on the mountain folds (lines L5 and L6) while bulging toward the valley fold (line L4) at the intermediate region, the temporary joints 44 and 45 are formed. Similarly to the temporary joints 41 and 42, since the temporary joints 44 and 45 sew up only a part of the tuck 35, when the airbag 20 is inflated, a region of the tuck 35 in the vicinity of the center C2 and apart from the temporary joint 44 and 45 unfolds and smoothly continues to the surrounding area of the occupant side wall 33 although the region in the vicinity of the temporary joints 44 and 45 stays inside the airbag 20 (FIGS. 4 and 5).

As shown in FIG. 9, when the airbag 20 is flattened, the sectorial regions A1 and A2 of the walls 22 and 23 that constitute the tucks 27 and 35 generally line up with each other and the temporary joints 41 and 44, temporary joints 42 and 45 (or sewn seams 43 and 46) also generally line up with each other.

More specifically describing the sectorial region A1 of the vehicle body side wall 22 as a representative of the regions A1 and A2, the lines L2 and L3 that define the sectorial region A1 run through the center C1 of the vehicle body side wall 22 and intersect at about 60°, as shown as an intersecting angle θ in FIG. 12A. In other words, the region A1 is a circle sector that shares the radius with the vehicle body side wall 22 and has a central angle of 60°. Accordingly, as shown in FIG. 12B, when forming the tuck 27 by generally mating the lines L2 and L3 and coupling the opposing walls 28 of the tuck 27 by the temporary joints 41 and 42 (i.e., the sewn seam 43), the length of the outer edge or outer circumference 22a of the vehicle body side wall 22 is shortened in a circumferential direction by the length of an arc AC (FIG. 12A) of the sectorial region A1, i.e., by about 5/6 of the length of the outer circumference 22a. The shortened outer edge 22a of the vehicle body side wall 22 will be shown at 22a' herein after, as shown in FIG. 12B.

In this connection, since the temporary joints 41 and 42 sew up only a part of the opposing walls 28 of the tuck 27, when the airbag 20 is inflated, the region of the tuck 27 apart from the temporary joint 41 and 42 cannot stay tucked toward an interior of the airbag 20, but unfolds in such a manner as to separate the opposing walls 28 (FIGS. 3 and 5). Moreover, the temporary joints 41 and 42 are not so formed as to cross with the outer edge 22a (edging joint 40) of the vehicle body side wall 22. Therefore, strictly speaking, it is not correct that the shortened outer edge 22a' of the vehicle body side wall 22 of the airbag 20 inflated with the temporary joints 41 and 42 kept jointed is about 5/6 of the outer edge 22a in a simply flattened state. However, the front end 41a of the front temporary joint 41 is located proximate the outer edge 22a of the vehicle body side wall 22 (i.e., proximate the edging joint 40 of the airbag 20), and the front end 44a of the temporary joint 44 on the occupant side wall 33 is located proximate the edging joint 40 as well. This configuration helps prevent the region of the tuck 27 proximate the outer edge 22a of the vehicle body side wall 22 (i.e., the region located outside of the temporary joint 41) from unfolding in such a manner as to separate the opposing walls 28 while the temporary joints 41 and 42 remain jointed, thereby keeping the outer edge 22a shortened as much as possible. In other words, although the region of the tuck 27 located proximate the inlet port 23 and apart from the rear temporary joint 42 forms a smoothly curved surface by unfolding of the creases on the lines L1, L2 and L3 at airbag inflation, the opposing walls 28 of the region located between the front temporary joint 41 and edging joint 40 are prevented from separating from each other because this region is located between the temporary joint 41 and temporary joint 44 of the occupant side wall 33. Therefore, the turn-round region 30 of the tuck 27 is allowed to stay inside the airbag 20 for a relatively long time (FIGS. 3 and 5), and the airbag 20 having the temporary joints 41, 42, 44 and 45 kept jointed is inflatable into such a shape as a generally convex lens which is shortened in length of the outer circumference or edging joint 40 generally by about 1/6 of that of the airbag 20 fully inflated after disjointing of the temporary joints 41, 42, 44 and 45.

Figure 8:
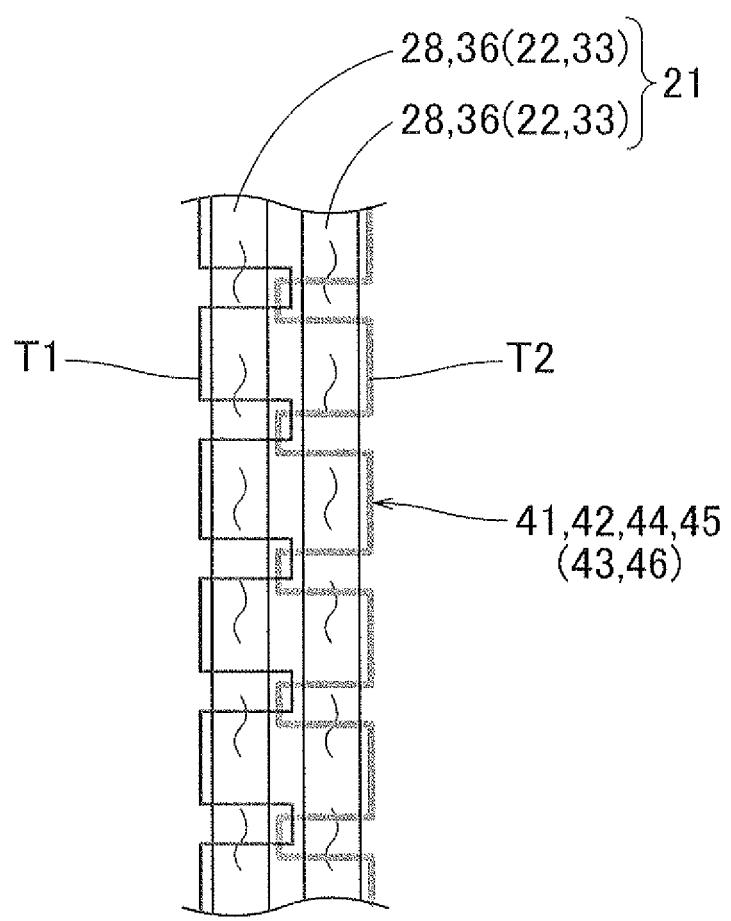
FIG. 8 is a schematic partial enlarged section of a sewn seam (temporary joints)

In this embodiment, as shown in FIG. 8, each of the temporary joints 41, 42, 44 and 45 is comprised of the sewn seam 43/46 that sews together parts of the vehicle body side wall 22 (opposing walls 28 of the tuck 27) or parts of the occupant side wall 33 (opposing walls 36 of the tuck 35) with two sewing threads T1 and T2. Out of the two sewing threads T1 and T2, the thread T1 has less strength (thickness) than the other thread T2 so as to be rupturable when an inner pressure of the airbag 20 is increased upon airbag deployment. More specifically, the sewing threads T1 and T2 are made of the same material but the thread T1 is thinner than the thread T2, thus making a difference in thread strength. Each of the sewing seams 43 and 46 is designed to unseam or disjoint by firstly rupturing of the sewing thread T1 at the ends 41a, 42a, 44a and 45a located proximate the outermost ends 29 and 37 when the inflated airbag 20 cushions an occupant and the inner pressure of the airbag 20 reaches a predetermined value, and by subsequent raveling of the ruptured thread T1 toward the ends 41b, 42b, 44b and 45b located in the vicinity of the turn-round region 30/38. The edging joint 40 of this specific embodiment, which joins the outer edges 22a and 33a of the vehicle body side wall 22 and occupant side wall 33 together, is comprised of a sewn seam formed by a sewing thread T3 (FIG. 5) that is stronger in thread strength than the sewing threads T1 and T2 for the temporary joints 41, 42, 44 and 45 and is unbreakable even at airbag inflation.

As best shown in FIG. 9, a vent hole 25 is formed within an area of the tuck 27 and in front of the inlet port 23 of the vehicle body side wall 22. The vent hole 25 is located on the side of the turn-round region 30 relative to the temporary joints 41 and 42 on the opposing walls 28, i.e., located on such a position that is closer to the turn-round region 30 than the temporary joints 41 and 42 are. In this embodiment, it is located to extend over the turn-round region 30. Specifically, in the vehicle body side wall 22 as is flattened, the vent hole 25 is formed generally into a circle and located between the sewn seam 43 such that the center thereof is located on the line L1 (FIGS. 9 and 12A). The inner diameter r1 of the vent hole 25 of this embodiment is smaller than the width H1 in a front and rear direction of the sewn seam 43 (temporary joints 41 and 42) as shown in FIG. 12A. The left and right sides of the vent hole 25 as viewed in the vehicle body side wall 22 in a flattened state (i.e., the lower area of the vent hole 25 at inflation of the airbag 20 mounted on a vehicle) are covered by the sewn seam 43 (temporary joints 41 and 42) over an entire area in a front and rear direction. While the temporary joints 41 and 42 remain jointed in an initial stage of airbag inflation, regions of the opposing walls 28 of the tuck 27 located on the side of the turn-round region 30 relative to the temporary joints 41 and 42 (sewn seam 43), i.e., regions of the opposing walls 28 around the vent hole 25, are pressed against each other by an inflation gas G fed into the airbag 20 as shown in FIG. 6, and therefore, the vent hole 25 is closed. Then when the temporary joints 41 and 42 are disjointed, the vent hole 25 opens up as shown in FIG. 14C.

Referring to FIG. 9, the airbag 20 further includes internally a tether 48. The tether 48 is provided to restrain a clearance between the vehicle body side wall 22 and occupant side wall 33 at airbag inflation and control the shape of the airbag 20 as fully inflated. In this specific embodiment, the tether 48 is comprised of two sheets of base cloths 49 and 50 respectively located on the side of the vehicle body side wall 22 and on the side of the occupant side wall 33. Each of the base cloths 49/50 includes a generally circular joint region 49a/50a coupled to the vehicle body side wall 22/occupant side wall 33 and two band-shaped extended regions 49b/59b extending from opposite edges of the joint region 49a/50a. Opposite ends of the extended regions 49b are sewn together with opposite ends of the extended regions 50b. The joint region 49a of the base cloth 49 is provided with apertures (reference numerals omitted) corresponding to the inlet port 23 and mounting holes 24 of the airbag 20.

Figure 13A:
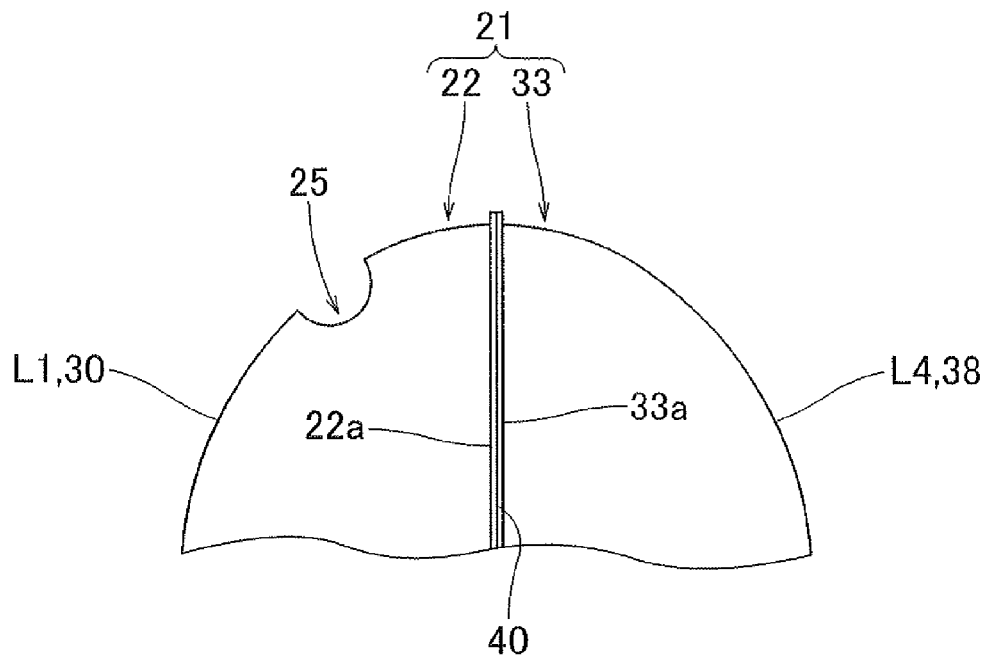
FIGS. 13A and 13B schematically illustrate the way the temporary joints are formed in a process of manufacturing of the airbag.
Figure 13B:
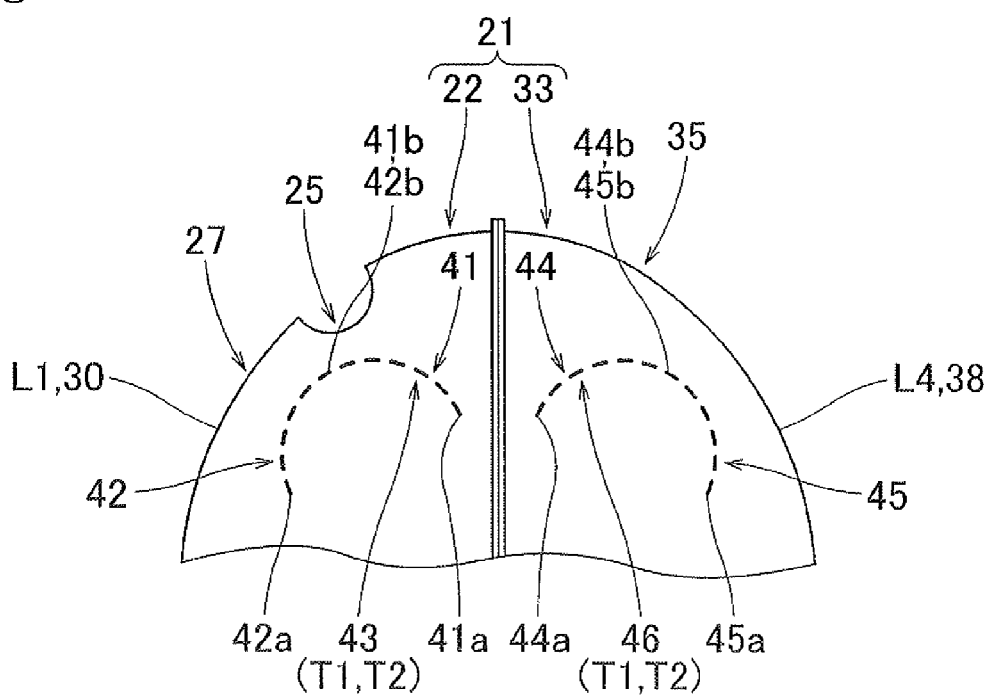

How to manufacture the airbag 20 is now described. The vehicle body side wall 22 and occupant side wall 33 are provided with the joint regions 49a and 50a of the base cloths 49 and 50 for the tether 48 sewn to respective inner surfaces. The occupant side wall 33 and vehicle body side wall 22 are overlaid one above the other such that their outer surfaces confront each other and their outer edges 22a and 33a are mated. The sewing thread T3 is used to sew together the outer edges 22a and 33a of the occupant side wall 33 and vehicle body side wall 22, thus forming the edging joint 40. Subsequently, the vehicle body side wall 22 and occupant side wall 33 are pulled apart from each other at the front region where the vent hole 25 is located, and the vehicle body side wall 22 is doubled on the line L1 running through the center C1 (i.e., on the line extending in a front and rear direction through the center C1 at full inflation of the airbag) in such a manner as to fold the vent hole 25 into two whereas the occupant side wall 33 is doubled on the line L4 running through the center C2 (i.e., on the line extending in a front and rear direction through the center C2 at full inflation of the airbag), locating the edging joint 40 generally at the center as shown in FIG. 13A, thereby forming the turn-round regions 30 and 38 of the tucks 27 and 35. Then as shown in FIG. 13B, the sewing threads T1 and T2 are used to sew together opposing areas of each of the vehicle body side wall 22 and occupant side wall 33 to form the sewn seams 43 and 46 (the temporary joints 41, 42, 44 and 45) on such positions as to be symmetrical relative to the edging joint 40. Thus the temporary joints 41, 42, 44 and 45 and tucks 27 and 35 are formed respectively on the vehicle body side wall 22 and occupant side wall 33.

Thereafter, the vehicle body side wall 22 and occupant side wall 33 are reversed inside out utilizing the inlet port 23 so the edging joint 40 may not be exposed outside. Subsequently, the extended regions 49b and 50b of the base cloths 49 and 50 for the tether 48 are taken out of the inlet port 23 and sewn together at corresponding ends. Thus the tether 48 is formed and the airbag 20 is completed.

To mount the airbag 20 on a vehicle, the retainer 9 is firstly located inside the airbag 20 so the unillustrated bolts of the retainer 9 protrude from the mounting holes 24, and the airbag 20 is folded up. The folded-up airbag 20 is wrapped up by a predetermined wrapping member for keeping the folded-up configuration. Subsequently, the airbag 20 is set on the bottom wall 12 of the case 11 such that the bolts of the retainer 9 project through the through holes 12b, and the body 10a of the inflator 10 is set in the insert hole 12a of the bottom wall 12 from below whereas the bolts of the retainer 9 are put though the flange 10c and then nut fastened. Thus the airbag 20 and inflator 10 are housed in and secured to the case or housing 11 utilizing the retainer 9. Thereafter, the airbag cover 15 is placed over the case 11 and coupled with the side wall 13 of the case 11 by the side wall 17 with rivets 18 or the like. If unillustrated horn switches are then mounted on the mounting tongues 13a of the case 11, the airbag apparatus M is assembled. The airbag apparatus M is mounted on the steering wheel body 1 preliminarily secured to the steering shaft SS utilizing the unillustrated mounting bases of the horn switch mechanisms, and thus mounted on a vehicle.

If a vehicle equipped with the airbag apparatus M cracks up while moving, the inflator 10 is actuated to discharge inflation gas from the gas discharge ports 10b to inflate the airbag 20, so that the airbag 20 pushes and opens the doors 16a of the airbag cover 15, and emerges from the case 11. Then the airbag 20 inflates into such a contour as a convex lens with a thick center and a thin hem and deploys to cover generally all over the top face of the steering wheel W, as indicated by double-dashed lines in FIGS. 1 and 2.

In the airbag 20, the temporary joints 41, 42, 44 and 45 are formed by joining the opposing walls 28/36 of the tuck 27/35 together in an area of the tuck 27/35 that is formed by tucking a part of the outer circumferential wall 21 toward an interior of the airbag 20. With this configuration, when the airbag 20 inflates with a suppressed volume with the temporary joints 41, 42, 44 and 45 kept jointed, the temporary joints 41, 42, 44 and 45 do not appear on the outer surface of the airbag 20 as shown in FIGS. 3 and 4. Further, each of the temporary joints 41, 42, 44 and 45 extends toward the turn-round region 30/38 and has the first end 41a, 42a, 44a and 45a proximate the outermost ends 29/37 near the outer surface of the airbag 20 and the second end 41b, 42b, 44b and 45b in the vicinity of the turn-round region 30/38. Accordingly, when the airbag 20 inflates with a suppressed volume, the outer circumferential wall 21 of the airbag 20 stays smooth even in areas where the tucks 27/35, temporary joints 41, 42, 44 and 45 are located as shown in FIGS. 3 to 5 as well as the temporary joints 41, 42, 44 and 45 hardly appear on the outer surface of the airbag 20. Therefore, although the temporary joints 44, 45 are located on the occupant side wall 33 contactable with an occupant, the airbag 20 inflated with a suppressed volume protects the occupant with no problem even in the event that an occupant contacts with the front area having the temporary joints 44, 45 and tuck 35.

When the airbag 20 inflated with a suppressed volume with the temporary joints 41, 42, 44 and 45 kept jointed cushions an occupant and resultingly is increased in inner pressure, the temporary joints 41, 42, 44 and 45 stop jointing the opposing walls 28/36. With the configuration of the foregoing embodiment, since the first ends 41a, 42a, 44a and 45a of the temporary joints 41, 42, 44 and 45 are located proximate the outermost ends 29/37 of the opposing walls 28/36, which are adjacent to and continuing to the outer surface of the airbag 20, a tensile force TF exerted on the outer circumferential wall 21 due to pressure increase of the airbag 20, as shown in FIGS. 7 and 14A to 14C, acts to separate the outermost ends 29 (37) of the opposing walls 28 (36), and triggers disjointing of the temporary joints 41 and 42 (44 and 45) from the first ends 41a and 42a (44a and 45a).

Figure 14A:
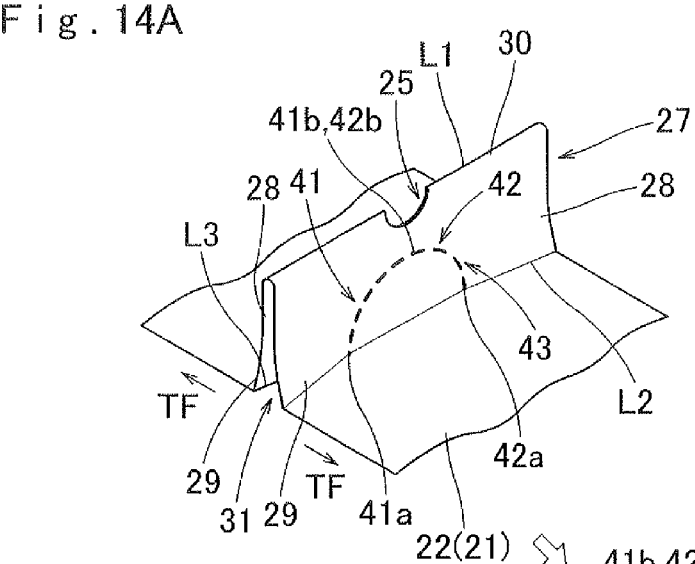
FIGS. 14A to 14C illustrate the process that the temporary joints disjoint by schematic partial enlarged perspective views.
Figure 14B:
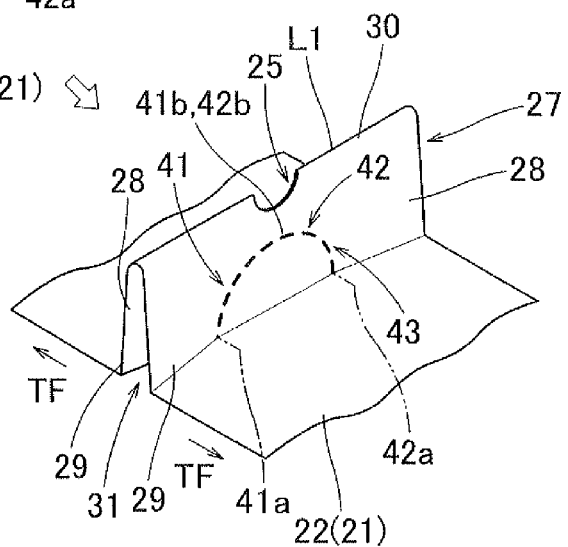
Figure 14C:
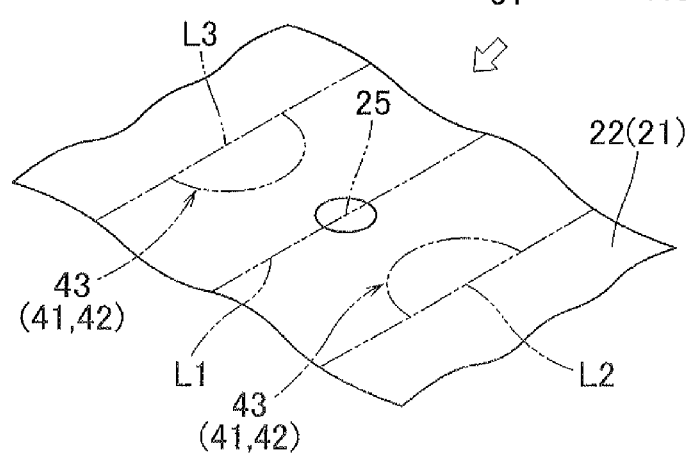
Figure 15:
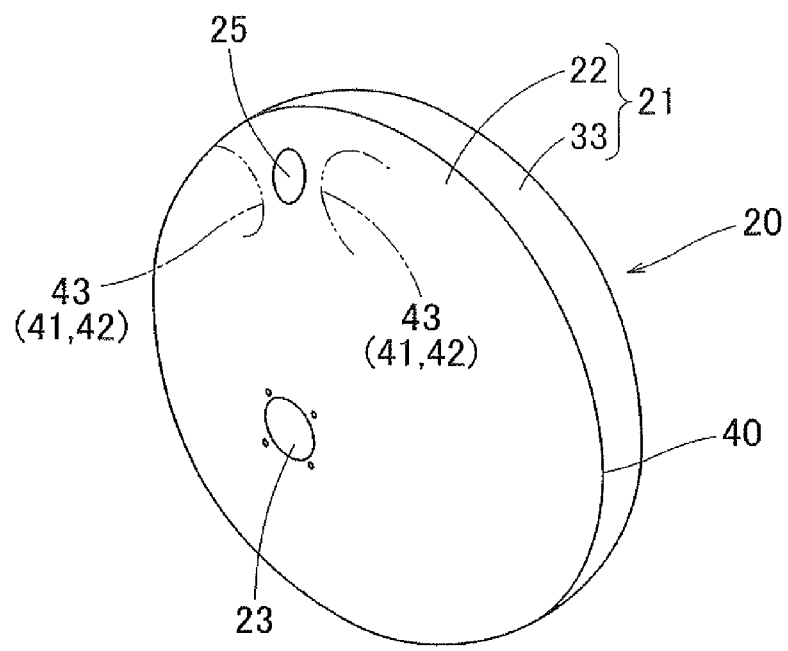
FIG. 15 is a schematic perspective view of the airbag of FIG. 3 inflated by itself after disjointing of the temporary joints, as viewed from the front.
Figure 16:
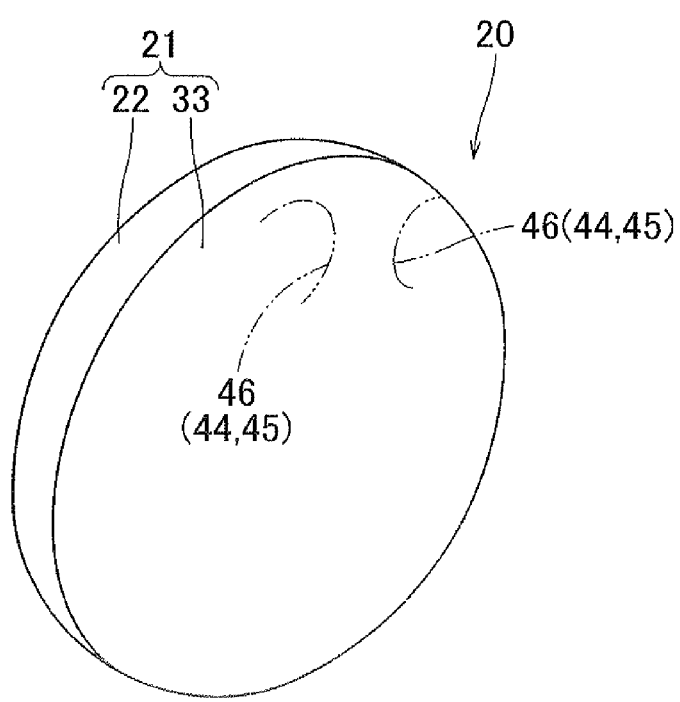
FIG. 16 is a schematic perspective view of the airbag of FIG. 3 inflated by itself after disjointing of the temporary joints, as viewed from the rear.

Since each of the temporary joints 41 and 42 (44 and 45) is formed into such a line that extends in a direction intersectional with the cleft 31 (39) formed between the outermost ends 29 (37) and toward the turn-round region 30 (38), once the disjointing starts from the first ends 41a and 42a (44a and 45a), the opposing walls 28 (36) are separated from each other from the outermost ends 29 (37) due to the tensile force TF acting on the outer circumferential wall 21 as shown in FIG. 7 (by double-dashed lines) and FIGS. 14A to 14C, as if the outermost ends 29 (37) or cleft 31 (39) gradually moved toward the turn-round region 30 (38). Then along with the movement of the outermost ends 29 (37) or cleft 31 (39), unseaming of the temporary joints 41 and 42 (44 and 45) smoothly propagates to the second ends 41b and 42b (44b and 45b) located in the vicinity of the turn-round region 39 (38). Especially in the foregoing embodiment, since the temporary joints 41 and 42 (44 and 45) are formed into a single line, disjointing starts at the first ends 41a and 42a (44a and 45a) located proximate the outermost ends 29 (37) and proceeds to the second ends 41b and 42b (44b and 45b) located in the vicinity of the turn-round region 30 (38). Thus, disjointing is preformed quickly.

That is, in the airbag 20, the temporary joints 41, 42, 44 and 45 disjoint quickly and smoothly since disjointing occurs at the first ends 41a, 42a, 44a and 45a immediately when the airbag 20 is increased in inner pressure, and propagates to the second ends 41b, 42b, 44b and 45b. When the disjointing is completed, the airbag 20 is increased in volume, and therefore, the inner pressure of the airbag 20 is lowered, thereby providing a soft cushioning effect.

Therefore, the airbag 20 of the foregoing embodiment has a smooth curved surface generally all over the outer circumferential wall 21 even when inflated with a suppressed volume, and provides a steady protecting property.

In the airbag 20, the vent hole 25 is located at such a position on the opposing walls 28 of the tuck 27 that is closer to the turn-round region 30 than the temporary joints 41 and 42 are. With this configuration, as shown in FIG. 6, the vent hole 25 is closed when the temporary joints 41 and 42 remain joined since an inflation gas G fed into the airbag 20 pushes regions of the opposing walls 28 located on the side of the turn-round region 30 relative to the temporary joints 41 and 42, i.e., regions of the opposing walls 28 around the vent hole 25, against each other. Then when the temporary joints 41 and 42 disjoint, the vent hole 25 opens up as shown in FIG. 14C. If thus an extra inflation gas G is released from the vent hole 25 upon disjointing of the temporary joints 41 and 42, an excessive increase of inner pressure of the airbag 20 is prevented and an even softer cushioning effect is provided.

Figure 17:
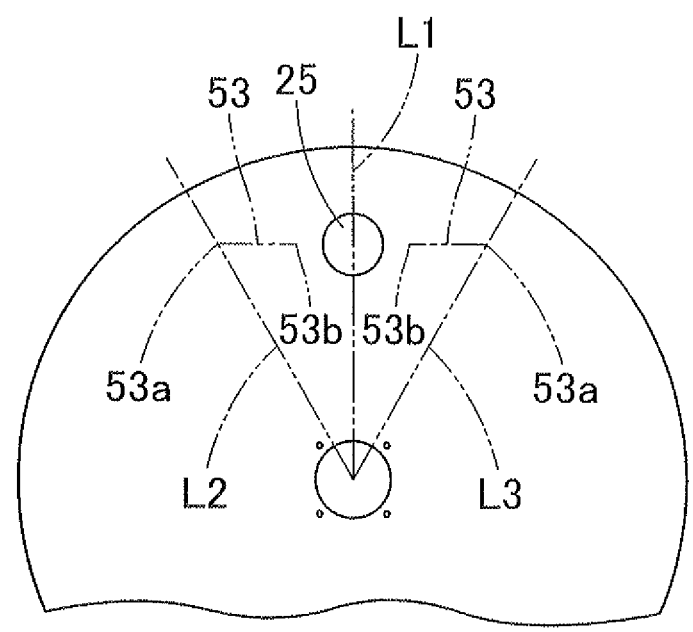
FIG. 17 is a partial enlarged plan view of a vehicle body side wall of a modification of the invention.

In the foregoing embodiment, each of the tucks 27/35 of the vehicle body side wall 22/occupant side wall 33 is provided with two temporary joints 41 and 42/44 and 45. In comparison with an instance where each of the tucks 27/35 includes only one temporary joint, this configuration will enlarge an area that the temporary joints 41 and 42/44 and 45 join the outer circumferential wall 21 together, thereby making smaller the volume of the airbag 20 inflated with the temporary joints 41, 42, 44 and 45 kept jointed. As a result, the airbag 20 has a great difference in volume between before and after disjointing of the temporary joints 41, 42, 44 and 45. Without considering such an advantageous effect, each tuck may include only one such a generally straight temporary joint shown at 53 in FIG. 17, that extends in a vertical direction and has a first end 53a proximate the outermost ends (i.e., proximate the lines L2 and L3) and has a second end 53b in the vicinity of the turn-round region (i.e., in the vicinity of line L1). Such a temporary joint may be formed into a straight line extending diagonally to a vertical direction or may also be formed into a curved line, provided that it extends in a direction intersectional with a cleft formed between the outermost ends.

The contour of the temporary joint that "extends in a direction intersectional with a cleft formed between the outermost ends and toward the turn-round region" is intended to refer to such a contour that makes advances toward the turn-round region gradually, and intended to exclude such a contour that once extends toward the turn-round region from the vicinity of the outermost ends but reverses toward the outermost ends on the way and again turns around toward the turn-round region in a curving fashion. Such a contour that extends along the cleft over a wide area in an intermediate region is excluded as well. However, such a contour that partially extends along the cleft in a second end located in the vicinity of the turn-round region is not excluded.

Moreover, in the foregoing embodiment, the two temporary joints 41 and 42 are so formed as to come close to each other toward the turn-round region 30 and have the second ends 41b and 42b in common. With this configuration, the temporary joints 41 and 42 (or sewn seam 43) extend over a wide range in a direction extending along the turn-round region 30 (i.e., in a front and rear direction) on the side of the outermost ends 29 relative to the vent hole 25 on the tuck 27. In other words, when the temporary joints 41 and 42 remain jointed, the regions of the opposing walls 28 on the side of the outermost ends 29 relative to the vent hole 25 are coupled together over a wide range in a direction extending along the turn-round region 30 (i.e., in a front and rear direction) that is intersectional with (i.e., orthogonal to) such a direction as to separate the opposing walls 28 from each other (i.e. a left and right direction). Accordingly, the regions of the opposing walls 28 on the side of the outermost ends 29 relative to the vent hole 25 remain attached to each other and prevent the vent hole 25 from opening up and leak gas while the temporary joints 41 and 42 remain jointed.

Figure 18:
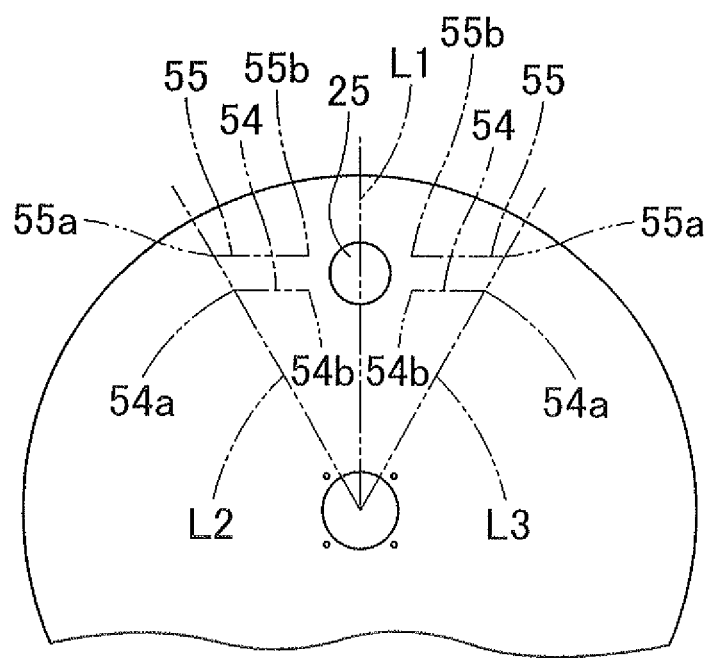
FIG. 18 is a partial enlarged plan view of a vehicle body side wall of another modification of the invention.

In the foregoing embodiment, especially, the inner diameter r1 (i.e., an opening width in a front and rear direction) of the vent hole 25 is smaller than the width H1 in a front and rear direction of the temporary joints 41 and 42 (sewing seam 43) as shown in FIG. 12A. Further, as shown in FIG. 5, the temporary joints 41 and 42 block up the lower side of the vent hole 25 at airbag inflation all over in a front and rear direction. This configuration prevents a peripheral area of the vent hole 25 from opening up and leak inflation gas while the temporary joints 41 and 42 remain jointed. Without considering such an advantageous effect, the temporary joint may be configured as shown in FIG. 18. In FIG. 18, two straight temporary joints 54 and 55 are arranged generally in parallel along a vertical direction such that the first ends 54a and 55a are located proximate the outermost ends (i.e., proximate the lines L2 and L3) and the second ends 54b and 55b are located in the vicinity of the turn-round region (i.e., in the vicinity of line L1). In such an instance, three or more temporary joints may be provided.

In the foregoing embodiment, the temporary joints 41, 42, 44 and 45 are comprised of the sewn seams 43 and 46 formed by sewing with sewing threads T1 and T2. Each pair of the temporary joints 41 and 42/44 and 45 having the second ends 41b and 42b/44b and 45b in common is formed by a single sewing work (i.e., by forming the seam 43/46). This configuration will reduce the number of processes of sewing work. Without considering such an advantageous effect, it will also be appreciated to form two temporary joints that come close to each other toward the turn-round region but do not have the second ends in common. The contour of the two temporary joints (sewn seam) having the second ends in common should not be limited to that disclosed in the foregoing embodiment, i.e., to a semi-arcuate shape, but may be a generally V shape, a generally U shape or the like.

Moreover, since the temporary joints 41, 42, 44 and 45 are formed by sewing with two sewing threads T1 and T2, manufacturing of the temporary joints 41, 42, 44 and 45 will be facilitated in comparison with an instance of using adhesive or the like, and disjointing of the temporary joints 41, 42, 44 and 45 will be facilitated as well, because once the sewing thread T1 is ruptured, raveling will smoothly propagate to the whole joints. Especially in the foregoing embodiment, the temporary joints 41, 42, 44 and 45 are comprised of the sewn seams 43 and 46 each of which sews the opposing walls 28/37 of the tuck 27/35 together with the sewing threads T1 and T2 having different thread strengths. When the airbag 20 at inflation cushions an occupant and gets a pressure increase over a predetermined value, a stress concentration will occur on the sewing thread T1 of weak strength and rupture the thread T1 easily, thereby disjointing the temporary joints 41, 42, 44 and 45 quickly. Without considering such an advantageous effect, however, the temporary joints may be formed by two sewing threads having equal strengths. Moreover, the temporary joints should not be limited to a sewn seam using a sewing thread. By way of example, a temporary joint may also be formed by adhering predetermined regions of opposing walls of the tuck by an adhesive such that the adhered regions will be separated when an inner pressure of the airbag reaches a predetermined value.

The airbag 20 of the foregoing embodiment is configured for use for a steering wheel and each of the tucks 27/35 is formed by tucking a part of the vehicle body side wall 22/occupant aide wall 33, each of which is generally circular in shape, in a circumferential direction extending along the outer edge 22a/33a. Further, each of the temporary joints 41, 42, 44 and 45 formed on the tuck 27/35 couples the opposing walls 28/37 of the tuck 27/35 together partially. This configuration, when the airbag 20 is inflated with a suppressed volume with the temporary joints 41, 42, 44 and 45 kept jointed, will not act to reduce the thickness of the airbag 20, but form the airbag 20 into such a contour as a generally convex lens with a slightly shortened outer circumference and thus with a slightly reduced outer diameter. More specifically, in the airbag 20, each of the tucks 27/35 is formed by tucking a part of the circular vehicle body side wall 22/occupant aide wall 33 in a circumferential direction. The temporary joints 41, 42, 44 and 45 that couples the opposing walls 28/37 of the tuck 27/35 together partially are located proximate the outer edge 22a/33a of the vehicle body side wall 22/occupant aide wall 33. This configuration will prevent the airbag 20 from inflating into an irregular shape quite unlike a shape like a generally convex lens having a generally circular outer circumference, but will keep it in a similar shape (i.e., a shape like a generally convex lens having a generally circular outer circumference) with a reduced outer diameter, when the airbag 20 is inflated with a suppressed volume with the temporary joints 41, 42, 44 and 45 kept jointed, as shown in FIGS. 3, 4, 15 and 16. Therefore, even when inflated with a suppressed volume, the airbag 20 will provide a sufficient thickness at the center area and a wide coverage over the steering wheel W.

Especially in the foregoing embodiment, the tuck 27/35 and temporary joints 41 and 42/44 and 45 are formed on both of the vehicle body side wall 22 and occupant side wall 33. This configuration will further prevent the airbag 20 inflated with the temporary joints 41, 42, 44 and 45 kept jointed from inflating into an irregular shape since both of the walls 22 and 33 are reduced in length of the outer edges 22a and 33a slightly, and will increase the difference in volume of the airbag 20 between before and after disjointing of the temporary joints 41, 42, 44 and 45. Without considering such an advantageous effect, the tuck and temporary joint(s) may be formed on only either one of the occupant side wall or vehicle body side wall. Furthermore, although the locations and contours of the tucks and temporary joints are identical on the occupant side wall and vehicle body side wall in the foregoing embodiment, locations and contours of the tucks and temporary joints may be different between the occupant side wall and vehicle body side wall. The size of the tuck and/or arrangement area of the temporary joint should not be limited to those described above, either, but may be arbitrarily decided based on a protection mode of an occupant. Changing of the size of the tuck (i.e., the outer contour of a sectorial area) will arbitrarily change an outer contour of the airbag inflated with a suppressed volume with the temporary joints kept jointed.

Although the foregoing embodiments of the invention have been described as applied to an airbag for use for a steering wheel, the application of the invention should not be limited thereby. The invention may also be applied to an airbag apparatus for a front passenger's seat.

What is claimed is:

1. An airbag folded up and housed in a housing for inflation with inflation gas and deployment, the airbag comprising:
   an outer circumferential wall made of flexible sheet material;
   a tuck that is formed by tucking a part of the outer circumferential wall toward an interior of the airbag so as to have a generally V-shaped section, the tuck including two opposing walls that oppose each other, a turn-round region that interconnects the opposing walls and forms a bottom of the tuck and outermost ends of the opposing walls that are adjacent to and continuing to an outer surface of the airbag;
   a temporary joint that joins the opposing walls of the tuck together partially in an area of the tuck in such a manner as to disjoint when an inner pressure of the airbag at inflation is increased, a periphery of the temporary joint defined by a line that extends in a direction intersectional with a cleft formed between the outermost ends and toward the turn-round region, the line being bent and having first ends proximate the outermost ends and an intermediate region that bulges toward the turn-round region.

2. The airbag of claim 1 further including a vent hole at such a position on the opposing walls that is closer to the turn-round region than the temporary joint is.

3. The airbag of claim 1 wherein two joints form the line that defines the periphery of the temporary joint.

4. The airbag of claim 3 wherein the two joints are so formed as to come close to each other toward the turn-round region.

5. The airbag of claim 1 wherein the temporary joint is formed by sewing with a sewing thread.

6. The airbag of claim 1, wherein:
the airbag is configured for use for a steering wheel and the outer circumferential wall is comprised of an occupant side wall deployable toward an interior of a vehicle and a vehicle body side wall deployable on the side of the steering wheel, which have identical generally circular outer contours;
the tuck and the temporary joint are formed on at least one of the occupant side wall and vehicle body side wall; and
the tuck is formed by tucking a part of the occupant side wall and/or vehicle body side wall in a radial direction extending along an outer edge of each of the walls.

7. The airbag of claim 6 wherein the tuck and temporary joint are formed on both of the occupant side wall and vehicle body side wall.

8. The airbag of claim 1, wherein the line that defines the periphery of the temporary joint has a semi-arcuate shape.

9. The airbag of claim 1, wherein the line that defines the periphery of the temporary joint has a general V-shape.

10. The airbag of claim 1, wherein the line that defines the periphery of the temporary joint has a general U-shape.

* * * * *